Sept. 2, 1941.  M. E. LESSIN  2,254,300
COSMETIC CONTAINER
Filed May 19, 1939
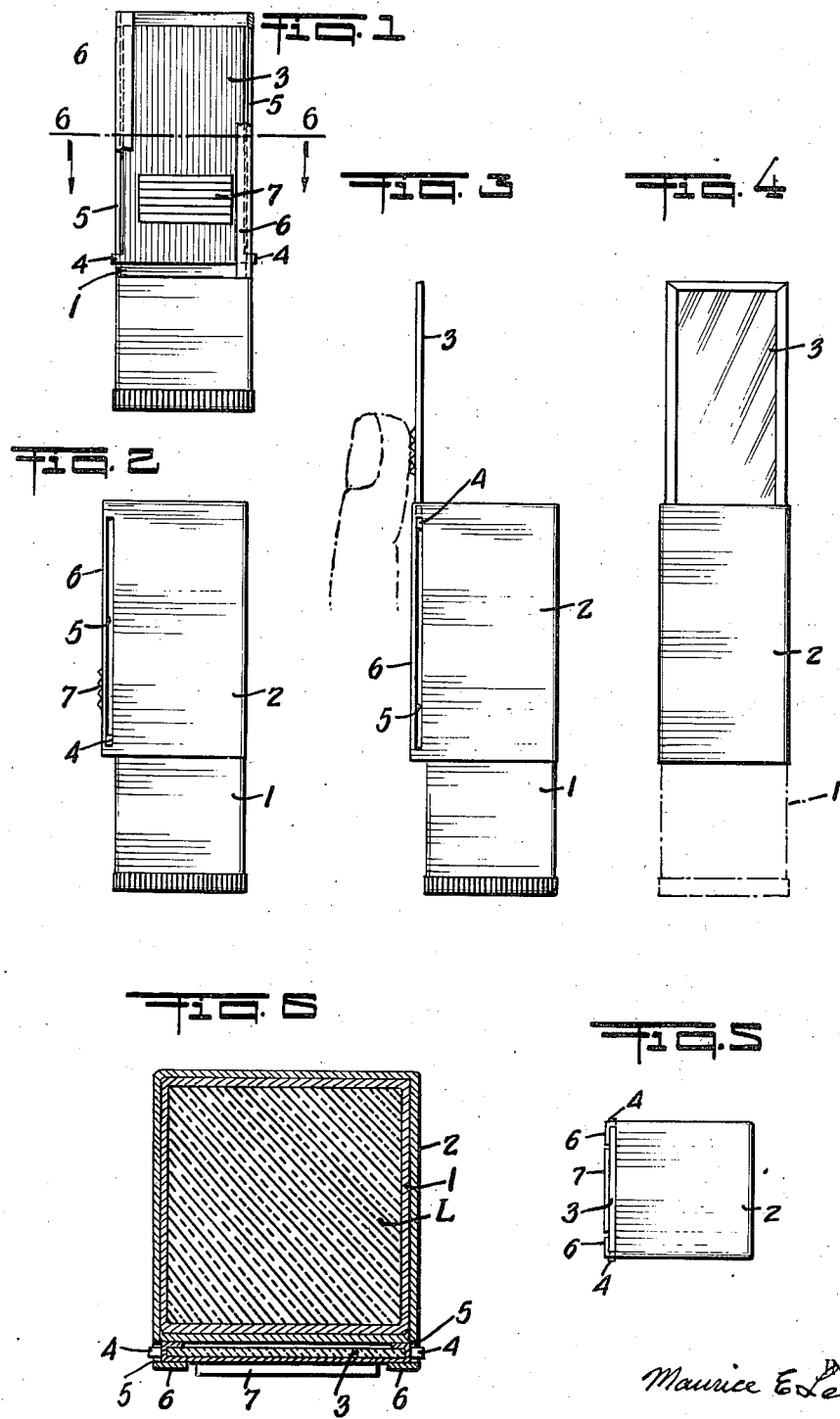
Maurice E. Lessin INVENTOR.

Patented Sept. 2, 1941

2,254,300

UNITED STATES PATENT OFFICE 2,254,300

COSMETIC CONTAINER

Maurice E. Lessin, New York, N. Y., assignor to Coty, Inc., Wilmington, Del., a corporation of Delaware Application May 19, 1939, Serial No. 274,577

2 Claims. (Cl. 132—79)

My invention relates to cosmetic containers and more particularly to a casing for a cosmetic, the casing having a mirror associated therewith.

One of the objects of my invention is to provide a lipstick case with means to slidably connect a mirror thereto.

Another object of my invention is to associate a mirror with a lipstick case wherein means are provided to adjust said mirror to the operative or inoperative position, said means being extremely simple so that substantial economies in the manufacture of the device are attained.

Other objects of my invention will be apparent from the following description, it being understood that the above general statement of the objects of my invention are intended to explain and not to limit it in any manner.

In the drawing,

Fig. 1 is a rear view of the combined lipstick and mirror, the guides controlling the movement of the mirror being partly broken away.

Fig. 2 is a side view thereof in its entirety.

Fig. 3 is a view similar to that of Fig. 2 showing the operation of the mirror.

Fig. 4 is a front view of the lipstick cover, the mirror being in the operative position, the lipstick holder being shown in dotted lines.

Fig. 5 is a top view of the combination.

Fig. 6 is an enlarged section on the line 6—6 of Fig. 1.

The combination comprises the lipstick holder 1 and the cover member 2, the lipstick L being retained in the holder 1 by means which are conventional and well known in the art, the frictional connection between the holder and cover member being likewise understood.

As shown in Fig. 3, the width of the cover member 2 is slightly greater than that of the holder 1 and in this section of the cover member 2 is disposed the mirror 3. The frame of the mirror 3 is provided with lugs 4 which are retained within the confines of slots 5 formed in the cover member 2 so that ejection of the mirror 3 from either end of the cover member 2 is prevented. Channel guides 6 are formed integral with the cover member 2, these guides overlapping the edges of the frame of the mirror 3 and forming a recess which prevents any other movement of the mirror 3 other than that parallel to the adjacent walls of the cover member 2.

The frame of the mirror 3 is provided with a boss 7 which may be knurled on its outer surface to facilitate the operation of the mirror as shown in Fig. 3.

It will be noted that no springs or other mechanical actuating means are necessary, and that the removal of the holder 1 from the cover member 2 can be attended with the manipulation of the boss 7 so that essentially a single operation is effective to present both the lipstick and mirror in operative position.

I have shown a preferred embodiment of my invention but it is obvious that numerous changes and omissions can be made without departing from its spirit.

I claim:

1. A lipstick casing having a body member for housing a lipstick and a cover member for enclosing the open end thereof, said cover member having flat sides, flanges formed on the outer wall of said sides operating as guideways and a mirror slidable in said guideways to the operative or inoperative positions, said mirror being externally and independently actuable in relation to said cover member.

2. A structure according to claim 1 wherein the reflecting surface of said mirror faces the adjacent flat side of said cover member, and a manipulating member connected to the outer, non-reflecting side of said mirror for actuating said mirror to the operative or inoperative positions.

MAURICE E. LESSIN.